United States Patent Office 3,183,214
Patented May 11, 1965

3,183,214
FLAME-RESISTANT POLYMERS
Frank J. Welch, Charleston, and Herbert J. Paxton, Jr., Elkview, W. Va., assignors to Union Carbide Corporation, a corporation of New York
No Drawing. Filed June 27, 1962, Ser. No. 205,541
12 Claims. (Cl. 260—67)

This invention relates to novel flame-resistant polymeric products. More particularly, this invention relates to novel adducts of acrolein polymers and phosphite diesters.

It is well known that polymers containing phosphorus are non-flammable. However, because of the lack of suitable phosphorus-containing polymerizable monomers, polymers of this types are not readily available, and those that are available are not widely used.

It has now been discovered that adducts of organic phosphite diesters and acrolein polymers are non-flammable and can be molded to form flame-resistant articles or can be employed as flame-resistant coatings. Moreover, these adducts are still reactive and, thus, can be incorporated into other polymer systems, such as polyepoxide or polyurethane systems, whereby the resulting polymeric compositions are rendered flame-resistant. Thus, by this invention, we have provided novel flame-resistant phosphorus-containing polymers having a wide range of applications.

By the term "acrolein polymer" is meant a homopolymer of acrolein or methacrolein, or copolymers of these monomers. The exact structure of these polymers is not known. Moreover, although acrolein and methacrolein can be polymerized by any of several techniques, such as by spontaneous thermal polymerization; free-radical polymerization processes employing peroxide, azo, or redox catalyst systems; in the presence of anionic or cationic catalysts; etc., the structure and the properties of the resulting polymers often vary depending upon the particular method employed for the polymerization. For example, it was recently determined that, contrary to general belief, the insoluble, infusible polyacrolein produced by spontaneous thermal polymerization (disacryl) or in the presence of redox catalyst, did contain pendant aldehyde groups. However, these aldehyde groups were not free, but were "masked" or bound up by aldehyde hydrate ether linkages, either along the same polymer chain or with other polymer chains, causing a high molecular weight (generally greater than 10,000), crosslinked resin, as represented by the following formula:

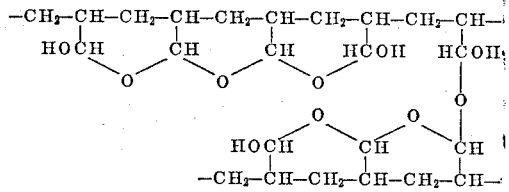

On the other hand, when acrolein is polymerized in the presence of aqueous sodium hydroxide a low molecular weight (generally about 500), uncrosslinked polymer is produced which was suggested by Gilbert et al., J. Am. Chem. Soc., 60, 1191 (1938), to have the formula:

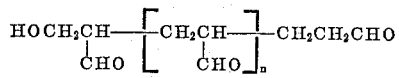

wherein $n$ is an integer. More recent research has indicated, however, that the aldehyde groups are largely masked in the form of hydrate ether linkages, although there is little or no crosslinking. Regardless of structure, however, these various acrolein polymers are suitable for the production of the adducts of this invention. Accordingly, for convenience in discussion, the acrolein polymers suitable for producing the adducts of this invention will be considered as containing recurring theoretical aldehyde-containing units of the formula:

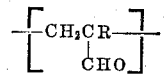

wherein R is either hydrogen or methyl.

The organic phosphite diesters which are employed in producing the adducts of the invention are normally liquid dihydrocarbyl phosphites wherein the hydrocarbyl group is free from olefinic or acetylenic unsaturation. In general, these diesters can be represented by the formula $(R'O)_2P(O)H$ wherein $R'$ is a lower hydrocarbyl group free of olefinic and acetylenic unsaturation. Thus, $R'$ can be an alkyl group, such as methyl, ethyl, propyl, isopropyl, butyl, hexyl, 2-ethylhexyl, decyl, and the like; or an aryl group such as phenyl or naphthyl. It is within the contemplation of this invention that $R'$ can be substituted with inert groups, such as alkyl groups, aryl groups, halogen, and the like. Thus, $R'$ can be an alkaryl group, such as tolyl, xylyl, mesityl, and the like; aralkyl, such as benzyl, phenethyl and the like; haloalkyl, such as 2-chloroethyl, 2-bromoethyl and the like, etc. As the size of $R'$ group increases, the phosphite diester tends to become less polar and therefore less reactive toward the acrolein polymer. Accordingly, it is preferred that $R'$ contain from 1 to about 10 carbon atoms, with phosphite diesters wherein $R'$ contains from 1 to 6 carbon atoms being especially preferred. As examples of suitable dihydrocarbyl phosphites one can mention dimethyl phosphite, diethyl phosphite, dipropyl phosphite, diisopropyl phosphite, dibutyl phosphite, dioctyl phosphite, dibenzyl phosphite, diphenyl phosphite, di-1-naphthyl phosphite, dimesityl phosphite, bis(2-chloroethyl)-phosphite, bis(2-bromoethyl)phosphite, and the like.

The adducts of this invention are produced by slurrying the acrolein polymer with an excess of the liquid phosphite diester. It is believed that the diester reacts with the pendant aldehyde groups, whether present as the free aldehyde group or masked, to form recurring α-hydroxyphosphonate ester units of the formula:

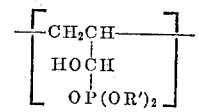

wherein $R'$ is as defined above. As the phosphite diester reacts with the acrolein polymer, the polymer particles swell and, as the reaction nears completion, the adduct dissolves in the phosphite diester. When the reactive lower alkyl phosphite diester, such as diethyl phosphite, is employed it is possible to react up to 30 percent or more of the theoretical aldehyde groups with the phosphite diester at room temperature. However, to form a soluble adduct and insure substantially complete reaction of the phosphite diester with the acrolein polymer it is generally necessary to heat the slurry to temperatures of at least about 50° C. and preferably to at least about 100° C. Temperatures of from about 150° C. to about 200° C. or higher should not be employed due to the tendency of the acrolein polymer to thermally degrade at these elevated temperatures. When the higher phosphite diesters such as dioctyl phosphite are employed, the adduct is normally insoluble in the liquid phosphite diester, even after prolonged heating. Nevertheless, it is still possible to form a moldable flame-resistant adduct wherein up to about 90 percent or more of the theoretical aldehyde groups are reacted with the phosphite diester even if the adduct is not soluble to a substantial degree in the liquid phosphite diester.

The reaction can be conducted in the presence of solvents for the acrolein polymer or the phosphite diester or for the resulting adduct if desired. However, they normally afford no particular advantages and for that reason are generally not employed.

Although it is known that aldehydes will react with phosphite diesters, it is necessary to employ basic or acid catalysts to promote the reaction. It was unexpectedly and surprisingly found, however, that the phosphite diester readily reacts with acrolein polymers without such catalysts, and, in fact, these catalysts fail to even accelerate the reaction.

The acrolein polymer-phosphite diester adduct can be recovered from the reaction mixture by conventional methods.

The acrolein polymer-phosphite ester adducts of this invention are flame-resistant and can be molded at temperatures in excess of 100° C. to form rigid, transparent, non-flammable article, or can be used for producing flame-resistant coatings. In general, the adduct should contain at least about 1 weight percent and preferably at least about 5 weight percent phosphorus for adequate flame resistance. The adducts of this invention, even when 100 percent of the theoretical aldehyde groups in the acrolein polymer have reacted with the phosphite diester, are especially well adapted for use as flame-retardant additives for other polymer systems. In general, this can be accomplished by admixing the acrolein polymer-phosphite diester adduct with the selected resin formulation, such as a urethane or an epoxy resin formulation, and then curing the admixture by methods known to one skilled in the art. The hydroxyl group present on the pendant α-hydroxyphosphonate ester group will react with the epoxy compound or isocyanate whereby the adduct becomes incorporated in the resulting resinous product.

The following examples are illustrative:

*Example I*

A slurry of 20 grams of powdered polyacrolein (produced using a redox catalyst; reduced viscosity of 5.1 as measured at 30° C. from a solution of 0.2 gram of the polyacrolein in 100 milliliters of a saturated solution of sulfur dioxide in water) and 100 milliliters of diethylphosphite was stirred for 25 hours at 27° C. The resulting slurry of swollen polymer particles was admixed with 500 milliliters of hexane and then filtered to recover a solid polyacrolein-diethyl phosphite adduct which, after washing twice with 500 milliliter portions of hexane and vacuum drying, weighed 27 grams. Elemental analysis of the adduct indicated it contained 5.2 weight percent phosphorus, 56.0 weight percent carbon, and 7.5 weight percent hydrogen, corresponding to a conversion of 32 percent of the theoretical aldehyde groups on the polyacrolein to hydroxyphosphonate groups. The polyacrolein-diethyl phosphite adduct was compression molded at 180° C. to form a rigid transparent, non-flammable plaque.

*Example II*

A slurry of 80 grams of polyacrolein (reduced viscosity of 5.1) and 800 milliliters of diethyl phosphite was allowed to stand for 3 days at 27° C. and was then heated at 110-130° C. for 16 hours, whereby the polyacrolein was completely dissolved in the diethyl phosphite. The resulting solution was admixed with 2 liters of hexane, whereupon a viscous oil separated. After decantation of the supernatant liquid, the oil was admixed with 1 liter of ethyl ether, whereupon a polyacrolein-diethyl phosphite adduct precipitated. After filtration from the ethyl ether and vacuum drying, the adduct weighed 144 grams. Elemental analysis indicated the adduct contained 12.6 weight percent phosphorus, corresponding to about 79 percent conversion of the theoretical aldehyde groups to hydroxyphosphonate groups. The polyacrolein-diethyl phosphite adduct was soluble in methanol and dimethylformamide, and had a reduced viscosity of 0.30 as measured at 30° C. from a solution of 0.2 gram of the adduct in 100 milliliters of dimethylformamide. The polyacrolein-diethyl phosphite adduct was compression molded at 130° C. to form a rigid, transparent, non-flammable plaque.

*Example III*

A slurry of 10 grams of powdered polyacrolein (reduced viscosity of 2.1 as determined at 30° C. from a solution of 0.2 gram of polyacrolein in a saturated solution of sulfur dioxide in water) and 100 milliliters of bis(2-chloroethyl) phosphite was held under a nitrogen atmosphere at 25° C. for 20 hours, and then heated at 100-110° C. for 20 hours to effect complete solution. The solution was then admixed with 1.5 liters of ethyl ether whereupon a polyacrolein-bis(2-chloroethyl) phosphite adduct precipitated. After decantation of the supernatant liquid, washing with ethyl ether, and vacuum drying, the adduct weighed 26 grams. The adduct contained 10.8 weight percent phosphorus, corresponding to a conversion of 92 percent of the theoretical aldehyde groups to hydroxyphosphonate groups. The polyacrolein-bis(2-chloroethyl) phosphite adduct could be molded at 130° C. to form a rigid, transparent, non-flammable plaque.

*Example IV*

A slurry of 50 grams of polyacrolein (reduced viscosity of 2.1) and 500 milliliters of diphenyl phosphite was held at 25° C. for 20 hours and then heated at 100-120° C. for 28 hours. The swollen polymer particles were filtered from the reaction mixture, washed three times with ethyl ether, and vacuum dried. The polyacrolein-diphenyl phosphite adduct thus produced weighed 108 grams and contained 10.6 weight percent phosphorus, corresponding to a conversion of 89 percent of the theoretical aldehyde groups to hydroxyphosphonate groups.

*Example V*

A slurry of 50 grams of polyacrolein (reduced viscosity of 2.1) and 500 milliliters of dibutyl phosphite was heated with stirring at 100-120° C. for 43 hours. The resulting slurry of swollen polymer particles in dibutyl phosphite was admixed with 2 liters of ether and the liquid decanted. The solid polyacrolein-dibutyl phosphite adduct, after washing twice with 500-milliliter portions of ether and then twice with 500-milliliter portions of heptane and drying at 55° C. in a forced air oven for 2.5 days, weighed 86 grams. The polyacrolein-dibutyl phosphite adduct contained 8.8 weight percent phosphorus, corresponding to a conversion of 71 percent of the theoretical aldehyde groups to hydroxyphosphonate groups. The polyacrolein-dibutyl phosphite adduct could be molded at 200° C. to produce a transparent, non-flammable plaque.

*Example VI*

A slurry of 10 grams of polyacrolein (reduced viscosity of 4.9) and 150 milliliters of dioctyl phosphite was heated at 140-150° C. for 6 hours, after which time 150 milliliters of the dimethyl ether of tetraethylene glycol were added and the resulting mixture was heated at 140-150° C. for 32 hours. The resulting swollen polymeric particles were filtered from the reaction mixture, washed with ethyl ether, and dried at 55° C. in a forced air oven. The resulting polyacrolein-dioctylphosphite adduct weighed 15 grams and contained 4.4 weight percent phosphorus, corresponding to a 51 percent conversion of the theoretical aldehyde groups to hydroxyphosphonate groups.

*Example VII*

Acrolein was polymerized in aqueous solution with sodium hydroxide as a catalyst, employing the procedure of Gilbert and Donleavy, J. Am. Chem. Soc., 60, 1191

(1938), to produce polyacrolein having a reduced viscosity of 0.01 as measured from a solution of 0.2 gram of the polyacrolein in 100 milliliters of a saturated solution of sulfur dioxide in water at 30° C. A 24-gram sample of the polyacrolein thus produced was dissolved in 275 milliliters of diethyl phosphite under a nitrogen atmosphere, and the solution was maintained at 27° C. for 8 hours with stirring and then heated at 120° C. for 40 hours with stirring. The resulting reaction mixture was admixed with 1.0 liter of n-butyl ether, whereupon a polyacrolein-diethyl phosphite adduct separated as an oil. After decantation of the supernatant liquid, the adduct was washed with n-butyl ether and then heated at 80° C. and 2 mm. of mercury to remove the solvent. The resulting solid product weighed 35 grams and contained 20.7 weight percent phosphorus. The polyacrolein-diethyl phosphite adduct was non-flammable, and was readily soluble in acetone and methanol, but only slightly soluble in benzene.

*Example VIII*

A slurry of 10 grams of poly(methacrolein) produced by spontaneous bulk polymerization of methacrolein (reduced viscosity of 0.05 as determined from a solution of 0.2 gram of the poly(methacrolein) in 100 milliliters of N,N-dimethylformamide at 30° C.) and 150 milliliters of diethyl phosphite was heated to reflux temperatures for 5 hours to dissolve the polymer. The reaction mixture was then admixed with 1 liter of ethyl ether, whereupon a poly(methacrolein)-diethyl phosphite adduct precipitated. After filtration from the diethyl ether, washing with ether, and vacuum drying at 27° C., the adduct weighed 3 grams and had a reduced viscosity of 0.16 in N,N-dimethylformamide. The adduct contained 1.6 weight percent phosphorus, corresponding to a conversion of 11 percent of the theoretical aldehyde groups to hydroxyphosphonate groups. The poly(methacrolein)-diethyl phosphite adduct could be molded at 175° C. to form a rigid, transparent plaque having a low degree of flammability.

The ether filtrates from the precipitation and washing steps were combined and evaporated to dryness, whereby 9 grams of a tacky poly(methacrolein)-diethyl phosphite adduct was recovered which contained 14.8 weight percent phosphorus, corresponding to 99.4 percent conversion of the theoretical aldehyde groups to hydroxyphosphonate groups. This resin had a reduced viscosity of 0.04 in dimethylformamide.

What is claimed is:

1. An adduct of a polymer selected from the group consisting of polyacrolein and poly(methacrolein) and a dihydrocarbyl phosphite of the formula $(R'O)_2P(O)H$ wherein $R'$ is selected from the group consisting of alkyl, aryl, aralkyl, alkaryl and haloalkyl of from 1 to 10 carbon atoms, said adduct containing at least 1 weight percent phosphorus present in the form of α-hydroxyphosphonate ester units.

2. A non-flammable adduct of polyacrolein and diethyl phosphite, said adduct containing at least 5 weight percent phosphorus present in the form of α-hydroxyphosphonate ester units.

3. A non-flammable adduct of polyacrolein and dibutyl phosphite, said adduct containing at least 5 weight percent phosphorus present in the form of α-hydroxyphosphonate ester units.

4. A non-flammable adduct of polyacrolein and diphenyl phosphite, said adduct containing at least 5 weight percent phosphorus present in the form of α-hydroxyphosphonate ester units.

5. A non-flammable adduct of polyacrolein and bis-(2-chloroethyl) phosphite, said adduct containing at least 5 weight percent phosphorus present in the form of α-hydroxyphosphonate ester units.

6. A non-flammable adduct of poly(methacrolein) and diethyl phosphite, said adduct containing at least 5 weight percent phosphorus present in the form of α-hydroxyphosphonate ester units.

7. The method for producing an adduct of a polymer selected from the group consisting of polyacrolein and poly(methacrolein) and a dihydrocarbyl phosphite of the formula $(R'O)_2P(O)H$ wherein $R'$ is selected from the group consisting of alkyl, aryl, aralkyl, alkaryl and haloalkyl of from 1 to 10 carbon atoms which comprises slurrying said polymer with a molar excess, based on the theoretical aldehyde groups of said polymer, of said phosphite in the absence of added catalyst at a temperature of from about room temperature up to about 150° C. for a period of time sufficient to produce said adduct.

8. The method for producing an adduct of polyacrolein and diethyl phosphite which comprises slurrying said polymer with a molar excess, based on the theoretical aldehyde groups of said polymer, of said phosphite in the absence of added catalyst at a temperature of from about room temperature up to about 150° C. for a period of time sufficient to produce said adduct.

9. The method for producing an adduct of polyacrolein and dibutyl phosphite which comprises slurrying said polymer with a molar excess, based on the theoretical aldehyde groups of said polymer, of said phosphite in the absence of added catalyst at a temperature of from about room temperature up to about 150° C. for a period of time sufficient to produce said adduct.

10. The method for producing an adduct of polyacrolein and diphenyl phosphite which comprises slurrying said polymer with a molar excess, based on the theoretical aldehyde groups of said polymer, of said phosphite in the absence of added catalyst at a temperature of from about room temperature up to about 150° C. for a period of time sufficient to produce said adduct.

11. The method for producing an adduct of polyacrolein and bis(2-chloroethyl) phosphite which comprises slurrying said polymer with a molar excess, based on the theoretical aldehdye group of said polymer, of said phosphite in the absence of added catalyst at a temperature of from about room temperature up to about 150° C. for a period of time sufficient to produce said adduct.

12. The method for producing an adduct of poly(methacrolein) and diethyl phosphite which comprises slurrying said polymer with a molar excess, based on the theoretical aldehyde groups of said polymer, of said phosphite in the absence of added catalyst at a temperature of from about room temperature up to about 150° C. for a period of time sufficient to produce said adduct.

References Cited by the Examiner

UNITED STATES PATENTS 3,044,996   7/62   Shokal _____ 260—67

OTHER REFERENCES

Kamai et al.: Zhur. Obshchei Khimi, 27, 2376–80 (1956).

Ibid., 28, 939–41 (1958).

WILLIAM H. SHORT, *Primary Examiner.*